United States Patent
Park

(10) Patent No.: US 11,545,862 B2
(45) Date of Patent: Jan. 3, 2023

(54) ROTOR MAGNET INSTALLATION STRUCTURE AND ROTOR MAGNET INSTALLATION METHOD

(71) Applicant: HANWHA POWER SYSTEMS CO., LTD, Changwon-si (KR)

(72) Inventor: Ki Hoon Park, Changwon-si (KR)

(73) Assignee: HANWHA POWER SYSTEMS CO., LTD, Changwon-si (KR)

(*) Notice: Subject to any disclaimer, the term of this patent is extended or adjusted under 35 U.S.C. 154(b) by 78 days.

(21) Appl. No.: 16/922,128

(22) Filed: Jul. 7, 2020

(65) Prior Publication Data
US 2021/0226495 A1  Jul. 22, 2021

(30) Foreign Application Priority Data
Jan. 22, 2020 (KR) .................... 10-2020-0008746

(51) Int. Cl.
| | | |
|---|---|---|
| H02K 1/30 | (2006.01) | |
| H02K 1/27 | (2022.01) | |
| H02K 15/12 | (2006.01) | |
| H02K 15/03 | (2006.01) | |
| H02K 1/2726 | (2022.01) | |

(52) U.S. Cl.
CPC ............ *H02K 1/30* (2013.01); *H02K 1/2726* (2013.01); *H02K 15/03* (2013.01); *H02K 15/12* (2013.01)

(58) Field of Classification Search
CPC ........ H02K 1/30; H02K 1/2726; H02K 15/03; H02K 15/12; H02K 2213/03; H02K 1/278; H02K 1/28; H02K 21/22
See application file for complete search history.

(56) References Cited

U.S. PATENT DOCUMENTS

| | | | |
|---|---|---|---|
| 7,042,118 B2 | 5/2006 | McMullen et al. | |
| 9,712,009 B2 | 7/2017 | Pukki et al. | |
| 2005/0099079 A1* | 5/2005 | McMullen | H02K 1/2733 310/156.11 |
| 2015/0084464 A1* | 3/2015 | Ramdane | H02K 1/28 310/90 |
| 2018/0363660 A1* | 12/2018 | Klahn | F04D 13/10 |

FOREIGN PATENT DOCUMENTS

KR  101918069 B1  11/2018

* cited by examiner

*Primary Examiner* — Thomas Truong
(74) *Attorney, Agent, or Firm* — Sughrue Mion, PLLC

(57) ABSTRACT

A rotor magnet installation structure includes: a first shaft including a shrinkage-fit portion in which an accommodation space is formed; at least one magnet inserted in the accommodation space, an installation outer diameter of the magnet being greater than an inner diameter of the accommodation space before the magnet is inserted in the accommodation space; and a second shaft comprising a connection portion inserted in the accommodation space, an outer diameter of the connection portion being greater than the inner diameter of the accommodation space before the connection portion is inserted in the accommodation space.

9 Claims, 7 Drawing Sheets

ROTOR MAGNET INSTALLATION STRUCTURE AND ROTOR MAGNET INSTALLATION METHOD

CROSS-REFERENCE TO THE RELATED APPLICATION

This application is based on and claims priority from Korean Patent Application No. 10-2020-0008746, filed on Jan. 22, 2020, in the Korean Intellectual Property Office, the disclosure of which is incorporated herein in its entirety by reference.

BACKGROUND

1. Field

One or more embodiments relate to a rotor magnet installation structure and a method for installing a rotor magnet.

2. Description of the Related Art

Motors for generating power generally include a stator and a rotor.

The structure of the rotor depends on the configuration and type of the motor. In the case of a permanent magnetic synchronous motor, a permanent magnet is generally installed on the rotor.

There are various methods for installing a permanent magnet on a rotor. U.S. Pat. No. 7,042,118 discloses a rotor magnet installation method using a sleeve, in which a magnet is arranged between two shafts facing each other, and portions of the two shafts and the magnet are fixed by shrinkage fit.

SUMMARY

One or more embodiments provide a rotor magnet installation structure and rotor magnet installation method.

Various aspects of the embodiment will be set forth in part in the description which follows and, in part, will be apparent from the description, or may be learned by practice of the presented embodiments.

According to one or more embodiments, a rotor magnet installation structure may include: a first shaft including a shrinkage-fit portion in which an accommodation space is formed; at least one magnet inserted in the accommodation space, an installation outer diameter of the magnet being greater than an inner diameter of the accommodation space before the magnet is inserted in the accommodation space; and a second shaft comprising a connection portion inserted in the accommodation space, an outer diameter of the connection portion being greater than the inner diameter of the accommodation space before the connection portion is inserted in the accommodation space.

The first shaft, the magnet, and the second shaft may be installed in a permanent magnetic synchronous motor.

A magnet installation portion may be formed to be extended from the connection portion, and the magnet may be installed on the magnet installation portion.

The magnet may have a cylindrical shape.

The magnet may include a plurality of magnets each of which has a segmented ring shape.

The first shaft may further include a non-shrinkage-fit portion connected to the shrinkage-fit portion, and only the shrinkage-fit portion among the shrinkage-fit portion and the non-shrinkage-fit portion may be subjected to shrinkage fit when the magnet is inserted in the accommodation space.

The second shaft further may further include a non-connection portion which is extended from the connection portion and is not inserted in the accommodation space, and only the connection portion among the connection portion and the non-connection portion may be subjected to the shrinkage fit when the connection portion is inserted in the accommodation space.

According to one or more embodiments, a rotor magnet installation method may include: preparing a first shaft comprising a shrinkage-fit portion, in which an accommodation space is formed, and a non-shrinkage-fit portion, at least one magnet having an installation outer diameter greater than an inner diameter of the accommodation space, and a second shaft comprising a connection portion having an outer diameter greater than the inner diameter of the accommodation space; expanding the accommodation space by heating only the shrinkage-fit portion among the shrinkage-fit portion and the non-shrinkage-fit portion; inserting the magnet and the connection portion into the expanded accommodation space; and cooling the shrinkage-fit portion.

The first shaft, the magnet, and the second shaft may be installed in a permanent magnetic synchronous motor.

A magnet installation portion may be formed extending in the connection portion, and the magnet may be installed on the magnet installation portion.

The magnet may have a cylindrical shape.

The magnet may include a plurality of magnets each of which has a segmented ring shape.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
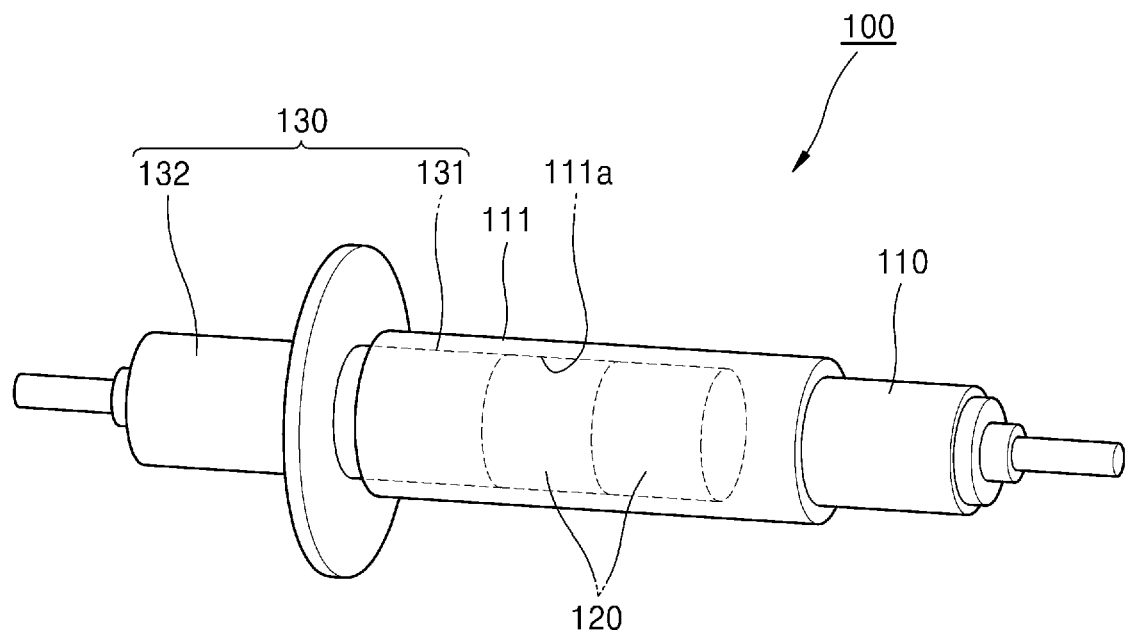
FIG. 1 is a schematic transparent perspective view illustrating a rotor magnet installation structure according to an embodiment.

Reference will now be made in detail to embodiments of the inventive concept which are illustrated in the accompanying drawings, wherein like reference numerals refer to like elements throughout. It is noted herein that all the embodiment described herein are example embodiments. In this regard, the presented embodiments have different forms and should not be construed as being limited to the descriptions set forth herein. Accordingly, the embodiments are merely described below, by referring to the drawings, to explain aspects of the inventive concept.

The embodiments herein are provided such that the description thereof will be thorough and complete, and will fully convey the scope of the inventive concept to those skilled in the art. In the drawings, the sizes and relative sizes of layers and regions may be exaggerated for clarity. In addition, it should be understood that all descriptions of principles, aspects, examples, and specific embodiments of the inventive concept are intended to encompass structural and functional equivalents thereof. In addition, these equivalents should be understood as including not only currently well-known equivalents but also equivalents to be developed in the future, that is, all devices invented to perform the same functions regardless of the structures thereof.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present.

Spatially relative terms, such as "beneath," "below," "lower," "under," "on," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. Expressions such as "at least one of," when preceding a list of elements, modify the entire list of elements and do not modify the individual elements of the list.

Figure 2:
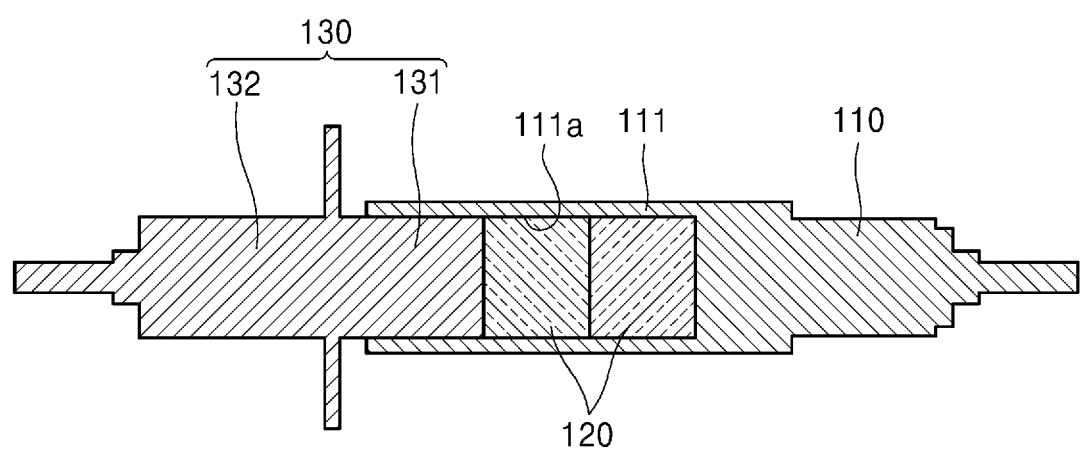
FIG. 2 is a schematic cross-sectional view of the rotor magnet installation structure of FIG. 1.
Figure 3:
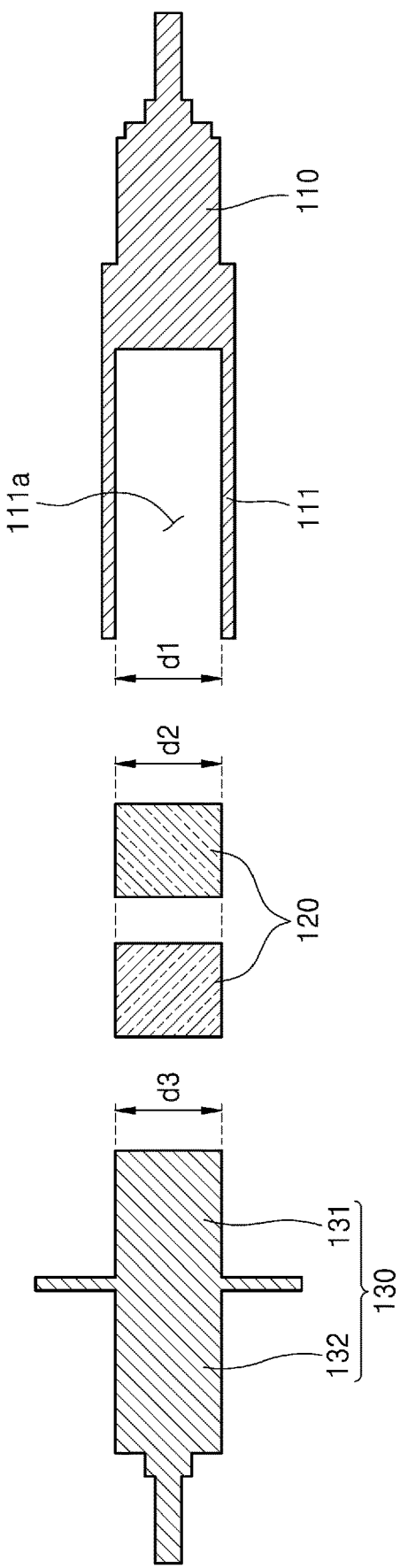
FIG. 3 is a schematic cross-sectional view illustrating each component of a rotor magnet installation structure before a rotor magnet installation structure according to an embodiment is installed.

FIG. 1 is a schematic transparent perspective view illustrating a rotor magnet installation structure according to an embodiment, FIG. 2 is a schematic cross-sectional view of the rotor magnet installation structure of FIG. 1, and FIG. 3 is a schematic cross-sectional view illustrating each component of a rotor magnet installation structure before a rotor magnet installation structure is assembled.

Although a rotor magnet installation structure 100 according to the embodiment is applied to a permanent magnetic synchronous motor (PMSM), the rotor magnet installation structure of the present disclosure is not limited thereto and may be applied to various motors.

As illustrated in FIGS. 1 to 3, the rotor magnet installation structure 100 according to the embodiment includes a first shaft 110, a magnet 120, and a second shaft 130.

The first shaft 110 includes an accommodation portion 111, and an accommodation space 111a is defined in the accommodation portion 111. According to an embodiment, the accommodation space 111a has a cylindrical shape, not being limited thereto. According to an embodiment, one end of the accommodation space 111a, which is opposite to the other end where the magnet 120 and a connection portion 131 of the second shaft 130 are to be inserted, is closed. The second shaft 130 includes the connection portion 131, which is to be inserted in the accommodation space 111a of the first shaft 110, and a non-connection portion 132 which is extended from the connection portion 131 and is not to be inserted in the accommodation space 111a of the first shaft 110 when the rotor magnet installation structure is assembled.

An inner diameter d1 of the accommodation space 111a is smaller than each of an installation outer diameter d2 of the magnet 120 and an outer diameter d3 of the connection portion 131 of the second shaft 130. The accommodation space 111a is machined to have the inner diameter d1 at such a level that the magnet 120 and the connection portion 131 can be shrinkage fit to the accommodation space 111a. For example, the inner diameter d1 is machined to be about 1.2/1000 less than each of the outer diameters d2 and d3.

Here, the magnet 120 is a permanent magnet, and at least one magnet 120 is arranged in the accommodation space 111a. The magnet 120 and the connection portion 131 of the second shaft 130 are in contact with each other, and inserted in the accommodation space 111a.

According to the embodiment, two magnets 120 are arranged. However, the inventive concept is not limited thereto. That is, the number of the arranged magnets is not particularly limited. For example, the number of the magnets arranged in the accommodation space 111a may be more than two.

The magnet 120 according to the embodiment has a cylindrical shape, but the inventive concept is not limited thereto. That is, the magnet according to an embodiment may have a segmented ring shape. In this case, the segmented rings may have arc lengths which are symmetrical or asymmetrical to each other. For example, in a case of the symmetrical arc lengths, each of the arc lengths is formed as an angle of about 180 degrees when the magnet is segmented into two segments, and each of the arc lengths is formed as an angle of about 120 degrees when the magnet is segmented into three segments.

As described above, the installation outer diameter d2 of the magnet 120 is greater than the inner diameter d1 of the accommodation space 111a to enable shrinkage fit. Here, the installation outer diameter d2 represents the diameter of the circle defined by the outer surface of the magnet 120 before the magnet 120 is inserted in the accommodation space 111a.

In a case in which the magnet 120 according to the embodiment has a cylindrical shape, the outer diameter of the magnet 120 directly becomes the installation outer diameter d2. However, in a case in which the magnet 120 has a segmented shape and is installed on a magnet installation portion, the diameter of a circle defined by an outer surface of the installed magnet 120 becomes the installation outer diameter d2.

Here, the second shaft 130 includes the connection portion 131 at one side thereof. The connection portion 131 has a cylindrical shape, and at least a portion of the connection portion 131 is inserted and fixed in the accommodation space 111a. The outer diameter d3 of the connection portion 131 is greater than the inner diameter d1 of the accommodation space 111a for the shrinkage fit.

Hereinafter, a rotor magnet installation method according to an embodiment is described for each operation with reference to FIGS. 4 to 6.

Figure 4:
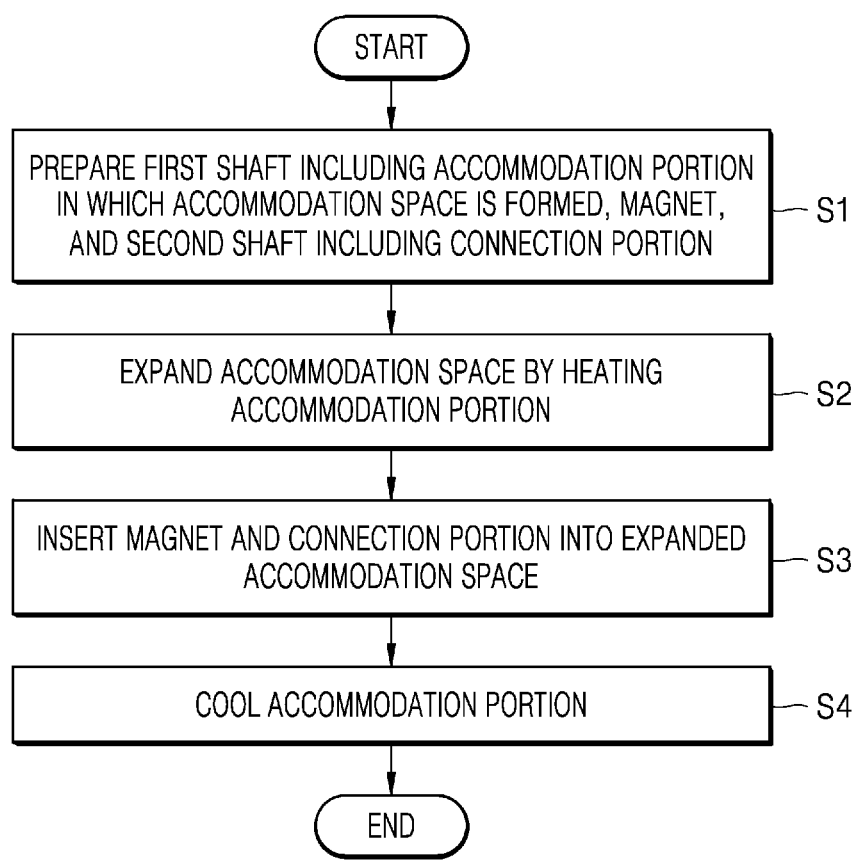
FIG. 4 is a flow chart illustrating each operation of a rotor magnet installation method according to an embodiment.
Figure 5:
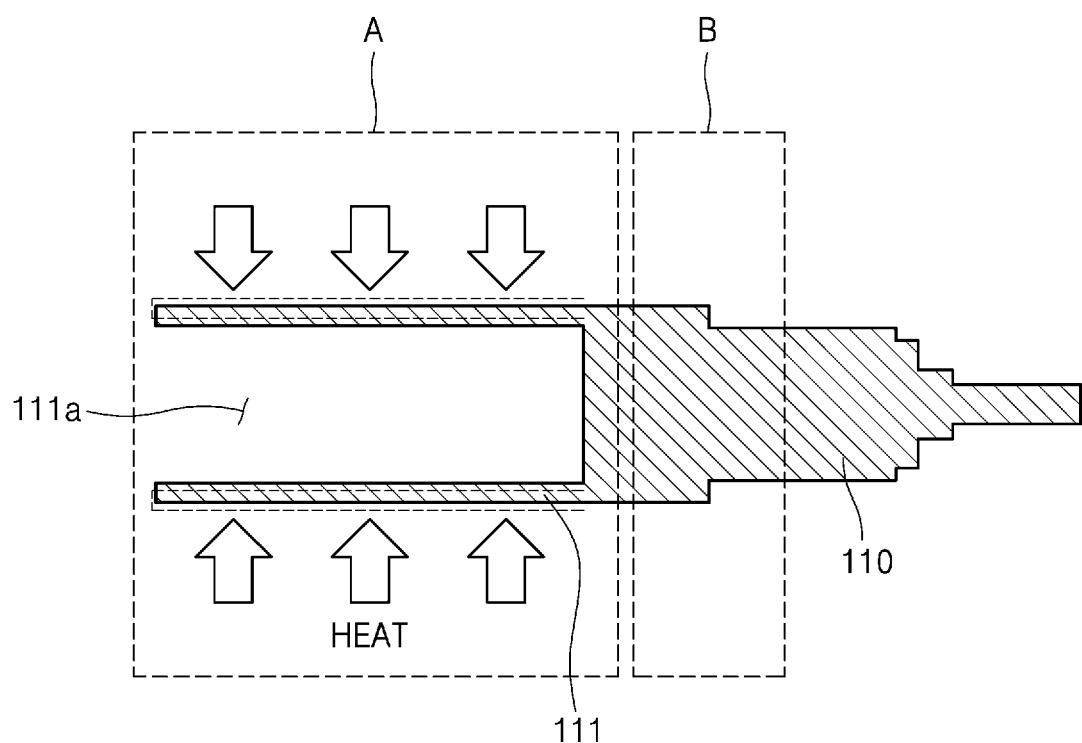
FIG. 5 is a schematic view illustrating a state in which an accommodation space is expanded by heating an accommodation portion of a first shaft according to an embodiment.
Figure 6:
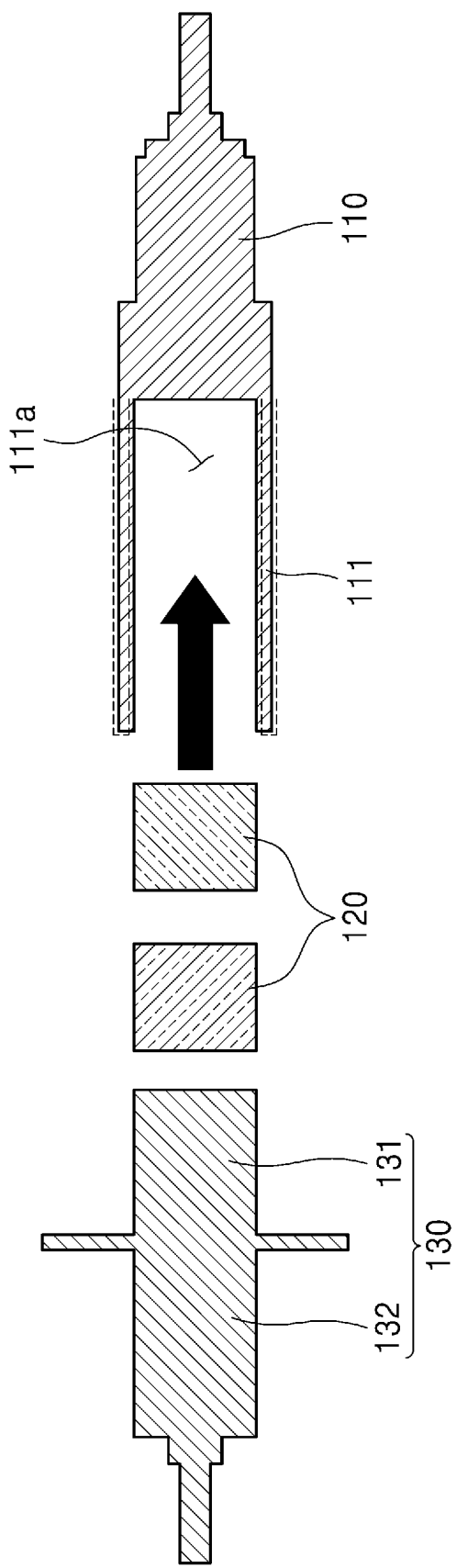
FIG. 6 is a schematic view illustrating an operation in which a magnet and a connection portion according to an embodiment are inserted into an expanded accommodation space.

FIG. 4 is a flow chart illustrating each operation of a rotor magnet installation method according to an embodiment, FIG. 5 is a schematic view illustrating a state in which an accommodation space is expanded by heating an accommodation portion of a first shaft according to an embodiment, and FIG. 6 is a schematic view illustrating an operation in which a magnet and a connection portion according to an embodiment are inserted into an expanded accommodation space.

First, an installer (or user) prepares the first shaft 110, the magnet 120, and the second shaft 130 as illustrated in FIG. 3 (S1).

Next, the installer expands the accommodation space 111a by heating the accommodation portion 111 of the first shaft 110 as illustrated in FIG. 5 (S2). That is, since fit according to the embodiment is shrinkage fit which is also referred to as thermal insertion, the accommodation portion 111 is heated by using an appropriate heating source. Here, since a portion subjected to the shrinkage fit is not a portion B but a portion A shown in FIG. 5, the fit portion becomes smaller than in U.S. Pat. No. 7,042,118 mentioned above. Here, the portion A may be the same as the accommodation portion 111 and referred to as a shrinkage-fit portion, and the portion B may be referred to as a non-shrinkage-fit portion connected to the shrinkage-fit portion. As a result of operation S2, non-uniform residual stress may be reduced. That is, when cooling is performed after expanding the accommodation space 111a for the shrinkage fit and inserting the connection portion 131 and the magnet 120 into the accommodation space 111a, non-uniform residual stress is likely to occur in a material. Thus, it is required to reduce a fit portion as much as possible for structural safety. In the embodiment, only the portion A of the first shaft 110 is subjected to the shrinkage fit, and accordingly, the possibility of occurrence of the non-uniform residual stress may be reduced.

Subsequently, the installer inserts the magnet 120 and the connection portion 131 into the expanded accommodation space 111a as illustrated in FIG. 6 (S3).

Then, the installer cools the accommodation portion 111 and completes the shrinkage fit in which the magnet 120 and the connection portion 131 are inserted and fixed in the accommodation space 111a (S4).

As described above, in the rotor magnet installation structure and the rotor magnet installation method according to the embodiment, the accommodation portion 111 is integrated with the first shaft 110, and thus a portion subjected to the shrinkage fit may be reduced. That is, since a sleeve for fixing a magnet is separated from a shaft in the case of U.S. Pat. No. 7,042,118 mentioned above, a heating process and a shrinkage fit process are required in both axial direction to couple the shaft and the sleeve. However, in the embodiment, a portion on one side of the first shaft 110, that is, the portion A shown in FIG. 5 is subjected to the shrinkage fit process, and thus an overall fit portion may be reduced. Accordingly, the residual stress due to the shrinkage fit may also be reduced, and thus the durability of the rotor magnet installation structure 100 may be enhanced.

Hereinafter, a rotor magnet installation structure and a rotor magnet installation method according to an embodiment will be described with reference to FIGS. 7 to 9.

Figure 7:
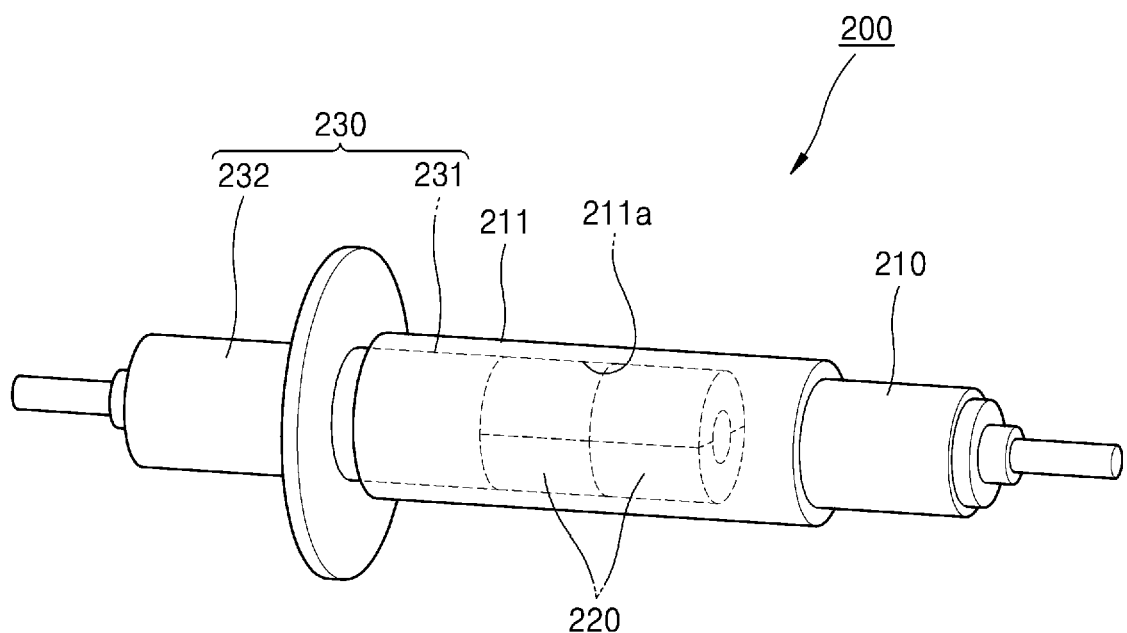
FIG. 7 is a schematic transparent perspective view illustrating a rotor magnet installation structure according to an embodiment.
Figure 8:
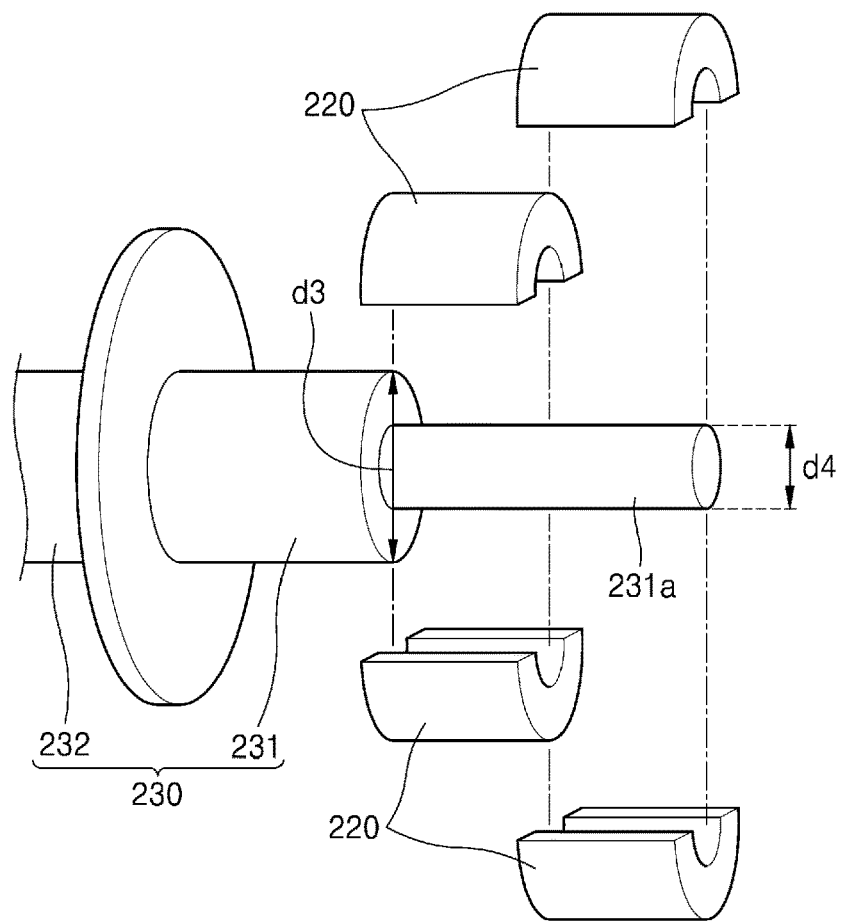
FIG. 8 is a schematic view illustrating a state in which a magnet is installed on a second shaft according to an embodiment.
Figure 9:
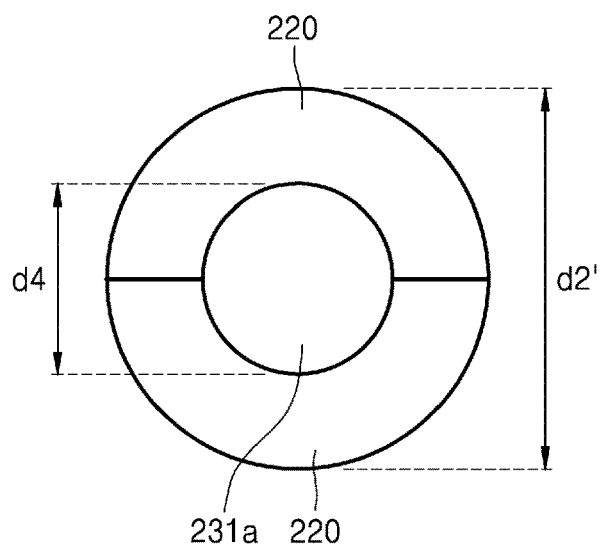
FIG. 9 is a schematic side view illustrating a state in which a magnet is installed on a second shaft according to an embodiment.

FIG. 7 is a schematic transparent perspective view illustrating a rotor magnet installation structure according to an embodiment, FIG. 8 is a schematic view illustrating a state in which a magnet is installed on a second shaft according to an embodiment, and FIG. 9 is a schematic side view illustrating a state in which a magnet is installed on a second shaft according to an embodiment.

As illustrated in FIGS. 7 to 9, a rotor magnet installation structure 200 according to the embodiment includes a first shaft 210, a magnet 220, and a second shaft 230.

The shapes and structures of the first shaft 210, an accommodation portion 211, and an accommodation space 211a according to the present embodiment are same as the first shaft 110, the accommodation portion 111, and the accommodation space 111a in the previous embodiment. Thus, their detailed descriptions will be omitted herein.

The magnet 220 according to the embodiment is a permanent magnet, has a segmented ring shape, and is arranged in the accommodation space 211a.

The magnet 220 according to the embodiment is composed of two sets. One set of the magnet 120 is segmented into two segments, and each of the arc lengths of the two segments is formed as an angle of about 180 degrees.

Here, the second shaft 230 includes a connection portion 231 at one side thereof, which is to be installed in the accommodation space 211a of the first shaft 210 and a non-connection portion 232 which is extended from the connection portion 231 and is not to be installed in the accommodation space 211a of the first shaft 210 when the rotor magnet installation structure is assembled. The connection portion 231 has a cylindrical shape and at least a portion thereof is arranged in the accommodation space 211a. An outer diameter d3 of the connection portion 231 is larger than an inner diameter d1 of the accommodation space 211a for the shrinkage fit.

A magnet installation portion 231a is formed by extending from the connection portion 231, and the magnet 120 which is formed of segmented magnets are installed on the magnet installation portion 231a. The magnet installation portion 231a has a cylindrical shape and has an outer diameter d4 which is appropriate for installation of the magnet 220.

When the magnet 220 is installed on the magnet installation portion 231a, an adhesive or the like may be used to fix the magnet on the magnet installation portion 231a.

The diameter of a circle defined by an outer surface of the magnet 220 installed on the magnet installation portion 231a is an installation outer diameter d2'. The installation outer diameter d2' is greater than the inner diameter d1 of the accommodation space 211a at a level that the shrinkage fit is possible.

In the embodiment, the magnet installation portion 231a having the outer diameter of d4 is prepared, and then the magnet 200 is installed thereon as it is. However, the inventive concept is not limited thereto. That is, according to an embodiment, the diameter of the magnet installation portion 231a is made greater, or an installation groove is provided in the outer circumference of the magnet installation portion 231a, and then the magnet 220 may be allowed to be installed in the installation groove.

The shrinkage fit operation of the rotor magnet installation method of the embodiment described above may be applied as it is to the rotor magnet installation method according to the present embodiment. Thus, its detailed descriptions will be omitted herein.

As described above, in the rotor magnet installation structure and the rotor magnet installation method according to the present embodiment, the accommodation portion 211 is integrated with the first shaft 210, and thus a portion subjected to the shrinkage fit may be reduced. That is, according to the present embodiment, an overall shrinkage fit portion may be reduced, and thus the residual stress due to the shrinkage fit may be reduced. Therefore, the durability of the rotor magnet installation structure 200 may be enhanced.

According to the above embodiments, the occurrence of non-uniform residual stress is reduced by reducing the shrinkage fit portion as much as possible even while using the shrinkage fit. Thus, the rotor magnet installation structure having the stable structure and the rotor magnet installation method can be improved.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the inventive concept as defined by the following claims.

What is claimed is:

1. A rotor magnet installation structure comprising:
   a first shaft comprising a shrinkage-fit portion having a form of sleeve providing an accommodation space, and a non-shrinkage-fit portion, the shrinkage-fit portion and the non-shrinkage-fit portion being a single continuous integrated structure;
   at least one magnet inserted in the accommodation space; and
   a second shaft comprising a connection portion installed in the accommodation space.

2. The rotor magnet installation structure of claim 1, wherein the accommodation space has a cylindrical shape.

3. The rotor magnet installation structure of claim 1, wherein one end of the accommodation space, which is opposite to the other end where the magnet and the connection portion of the second shaft are inserted, is closed.

4. The rotor magnet installation structure of claim 1, wherein the first shaft, the magnet, and the second shaft are installed in a permanent magnetic synchronous motor (PMSM).

5. The rotor magnet installation structure of claim 1, wherein a magnet installation portion is formed to be extended from the connection portion, and the magnet is installed on the magnet installation portion.

6. The rotor magnet installation structure of claim 1, wherein the magnet has a cylindrical shape.

7. The rotor magnet installation structure of claim 1, wherein the magnet comprises a plurality of arc-shaped magnets forming a single cylindrical-shaped structure.

8. The rotor magnet installation structure of claim 1, wherein the first shaft further comprises a non-shrinkage-fit portion connected to the shrinkage-fit portion, and
   wherein only the shrinkage-fit portion among the shrinkage-fit portion and the non-shrinkage-fit portion is subjected to shrinkage fit when the magnet is inserted in the accommodation space.

9. The rotor magnet installation structure of claim 8, wherein the second shaft further comprises a non-connection portion which is extended from the connection portion and is not inserted in the accommodation space, and
   wherein only the connection portion among the connection portion and the non-connection portion is subjected to the shrinkage fit when the connection portion is inserted in the accommodation space.

* * * * *